US008480290B2

(12) United States Patent
Fiorentini et al.

(10) Patent No.: US 8,480,290 B2
(45) Date of Patent: Jul. 9, 2013

(54) SELF-CLEANING HIGH-PRESSURE MIXING APPARATUS FOR COMPOSITE MATERIAL

(75) Inventors: Carlo Fiorentini, Caronno Pertusella (IT); Maurizio Corti, Caronno Pertusella (IT)

(73) Assignee: Afros S.p.A., Caronno Pertusella (IT)

( * ) Notice: Subject to any disclaimer, the term of this patent is extended or adjusted under 35 U.S.C. 154(b) by 0 days.

(21) Appl. No.: 13/475,087

(22) Filed: May 18, 2012

(65) Prior Publication Data
US 2012/0300574 A1 Nov. 29, 2012

(30) Foreign Application Priority Data

May 19, 2011 (IT) .............................. MI2011A0892

(51) Int. Cl.
*B29B 7/76* (2006.01)
(52) U.S. Cl.
USPC ....................................... 366/162.5; 422/133
(58) Field of Classification Search
USPC ............. 366/138, 159.1, 162.4, 162.5, 167.1, 366/173.1; 422/131, 133–135
See application file for complete search history.

(56) References Cited

U.S. PATENT DOCUMENTS

| 4,332,335 | A | | 6/1982 | Fiorentini | |
|---|---|---|---|---|---|
| 5,143,946 | A | * | 9/1992 | Proksa et al. ................. | 521/155 |
| 5,443,797 | A | * | 8/1995 | Proksa et al. ................. | 422/133 |
| 5,453,249 | A | * | 9/1995 | Proksa et al. ................. | 422/133 |
| 5,858,416 | A | * | 1/1999 | Sochtig et al. ................ | 425/117 |
| 6,065,862 | A | * | 5/2000 | Althausen et al. ......... | 366/162.5 |
| 6,079,867 | A | * | 6/2000 | Fiorentini et al. ......... | 366/159.1 |
| 6,502,978 | B2 | * | 1/2003 | Bonansea et al. .......... | 366/162.5 |
| 6,619,834 | B2 | * | 9/2003 | Krader et al. .............. | 366/162.5 |
| 7,455,446 | B2 | * | 11/2008 | Corti et al. ................. | 366/162.5 |
| 2001/0001602 | A1 | * | 5/2001 | Bonansea et al. .......... | 366/162.5 |
| 2001/0017816 | A1 | * | 8/2001 | Krader et al. .............. | 366/162.5 |
| 2003/0099152 | A1 | * | 5/2003 | Krader et al. .............. | 366/162.5 |
| 2012/0300574 | A1 | * | 11/2012 | Fiorentini et al. ......... | 366/162.5 |

FOREIGN PATENT DOCUMENTS

| EP | 0 895 815 A1 | | 2/1999 |
|---|---|---|---|
| JP | 01163032 A | * | 6/1989 |
| JP | 07040337 A | * | 2/1995 |
| JP | 07108530 A | * | 4/1995 |

* cited by examiner

*Primary Examiner* — Charles E Cooley
(74) *Attorney, Agent, or Firm* — Lucas & Mercanti, LLP

(57) ABSTRACT

A high-pressure mixing apparatus for producing and discharging a composite material resulting from a reactive mixture of at least a first and a second chemical components and from a filler material. The apparatus includes a main body, provided with a discharge duct for the composite material, at least one high-pressure mixing chamber for the chemical components and a first cleaning member axially displaceable between a forward and a rearward position within the discharge duct. The apparatus also comprises a second cleaning member with a control device selectively actuable to sequentially move the first and the second cleaning member between the rearward position, in which the first cleaning member opens the discharge duct, and the forward position in which the facing annular surfaces of the discharge duct and the second cleaning member are mutually abutting to eject the residual reactive mixture and close the exit port of the mixing chamber.

18 Claims, 8 Drawing Sheets

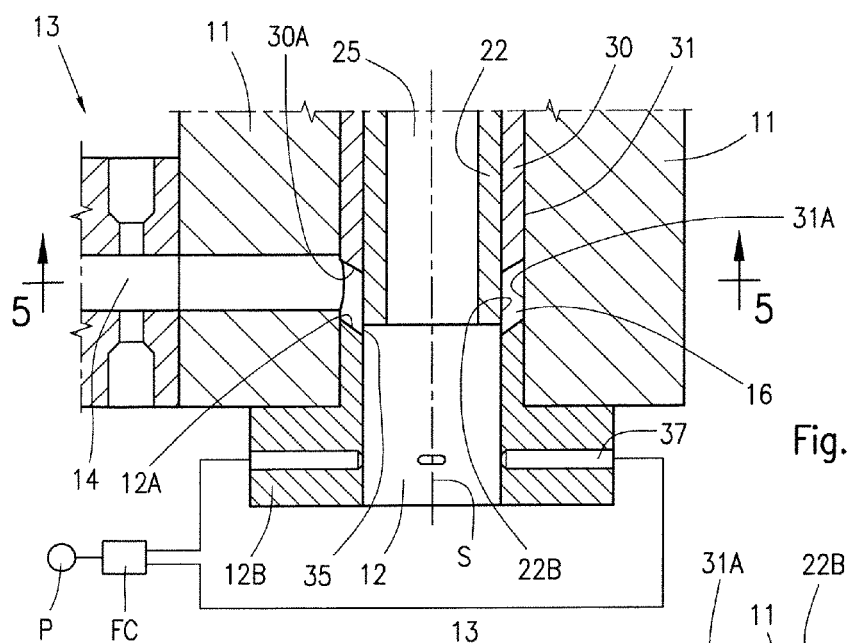
Fig. 4
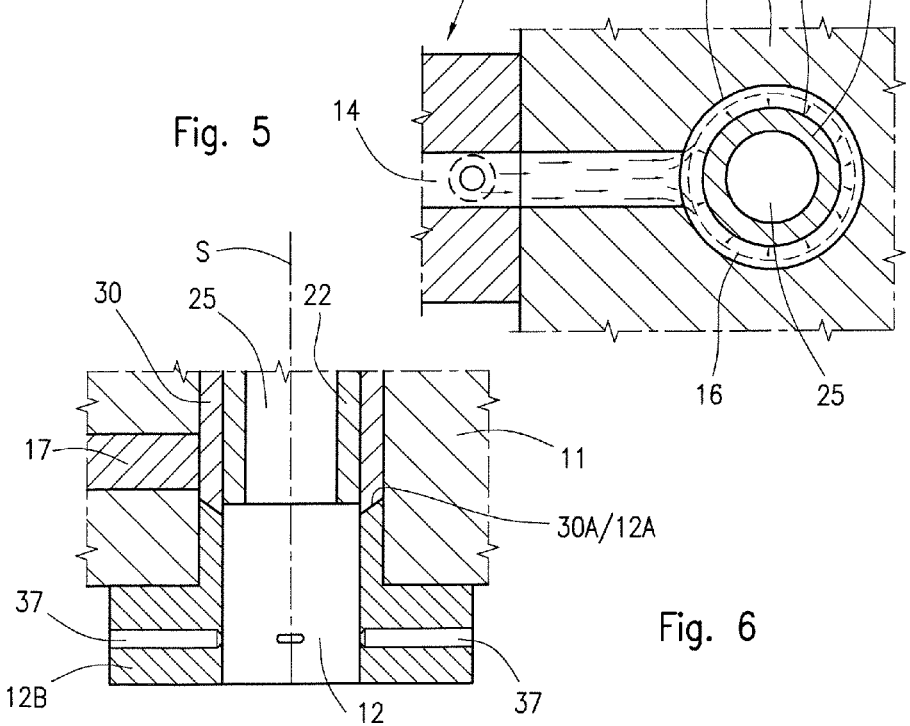
Fig. 5
Fig. 6

SELF-CLEANING HIGH-PRESSURE MIXING APPARATUS FOR COMPOSITE MATERIAL

This application claims priority to and the benefit of Italian Application No. MI2011A000892 filed on May 19, 2011, the content of which is incorporated herein by reference.

BACKGROUND OF THE INVENTION

The present invention relates to a self-cleaning apparatus of high-pressure type, for producing composite material resulting from a mixture of a chemically reactive resin and a filler material, consisting, for example, of fiber material and/or granular material, in the production of structural panels, automotive body parts and general molded parts.

STATE OF THE ART

In the production of molded parts of synthetic resin by means of a chemically reactive mixture, for example a polyurethane, epoxy or polyester mixture, obtained from two or more chemically reactive components, that are deeply mixed and then discharged onto a substrate or into the cavity of a mold, the use is known of a self-cleaning mixing device, of high-pressure type, disclosed for example in U.S. Pat. No. 4,332,335.

The device comprises a small high-pressure mixing chamber, in which the chemically reactive components are injected and deeply mixed and in which the mixing chamber directly communicates with a discharge duct for the resulting reactive mixture. A first cleaning member, provided with longitudinal grooves, provides to recirculate the single components and to clean the mixing chamber; a second cleaning member is alternatively displaceable within a guide hole between a rearward position, in which said second cleaning member enables the communication between the mixing chamber and the discharge duct, and a forward position, in which said second cleaning member closes the discharge duct, ejecting the residual mixture remaining within said discharge duct.

In the production of technical items of synthetic resin, by means of RIM molding processes with mixtures of synthetic resins starting from chemically reactive components, it is as well known to combine the reactive mixture with a filler material, for example fibrous material and/or granular material, in order to improve some physical and mechanical properties of the end items.

In particular, in the production of items of synthetic resin, reinforced with fibers, various systems were proposed in order to feed and mix a fiber material with a chemically reactive polyurethane mixture, and in which the resulting composite material is discharged onto a substrate or into the cavity of a mold.

High-pressure mixing apparatuses, provided with suitable means for feeding a chemically reactive mixture into a flow of fibrous material, are disclosed for example in U.S. Pat. Nos. 5,858,416 and 6,502,978.

In particular, U.S. Pat. No. 5,858,416 discloses a high-pressure mixing apparatus, suitable for producing a synthetic resin reinforced with fibers, in which a flow of fluidized fibers is fed by means of a tubular element fixed to the body of the apparatus, which tubular element extends along a through hole of a displaceable cleaning member and along a discharge duct for the resulting composite material.

U.S. Pat. No. 6,502,978, in turn, suggests a simplification and an improvement of such an apparatus, by providing the feeding channel of the fluidized fibers directly inside the displaceable cleaning member, in which the fore end of the cleaning member is conformed as well with a conical surface suitable for causing the reactive mixture, flowing out of the mixing chamber, to deflect into the flow of fluidized fibrous material, within an impregnation region at the rear end of the discharge duct.

Although said mixing apparatus proved itself very advantageous and useful in multiple applications, however said mixing apparatus exhibits some disadvantages, that require further improvements.

In particular, since the high-pressure mixing chamber directly leads into the discharge duct, as well as due to the disaligned arrangement of the channel for feeding the fibers, the flow of reactive mixture, flowing out of mixing chamber at highly turbulent conditions, does not homogeneously distribute around and internally to the beam of fibers that flows out of the feeding channel at high speed.

In a further known solution, it was proposed to modify the cleaning member by providing it with a circular groove for the circulation of the reactive mixture.

Such a known solution is shown for example in FIGS. 1 and 2 of the enclosed drawings, that illustrate the previous art, in which the same reference number were used as the following figures, that illustrate a preferred solution of the present invention, in order to indicate similar or equivalent parts.

In a few words, according to FIGS. 1 and 2, the mixing apparatus 10 comprises a main body 11 provided with a discharge duct 12 for a composite material resulting from the combination of a reactive mixture of a first and a second chemical component, and from a fluidized filler material, in which the duct 12 substantially consists of a sleeve fixed within an accommodating seat at the fore end of the body 11. A high-pressure mixing chamber for the two chemically reactive components is indicated as well by 14, which two chemically reactive components are injected through respective nozzles 15' and 15". The mixing chamber 14 communicates with the discharge duct 12 via a circular groove 16 obtained in a tubular cleaning member 22 for the discharge duct 12, which circular groove 16 defines, in the rearward position of FIG. 1, a circulation channel for the reactive mixture.

In a per se known manner, the cleaning member 22 comprises a longitudinal channel 25 for feeding a fluidized filler material, and is provided, at the fore end, with a conical surface 22', suitable for directing the flow of reactive mixture towards the filler material flowing out of the feeding channel 25.

The cleaning member 22 is displaceable between the rearward position, shown in FIG. 1, in which the circular groove 16 is positioned at the mixing chamber 14, and the forward position of FIG. 2, in which the fore end of the cleaning member 22 protrudes by a certain section from the discharge channel 12.

Such an apparatus is not able to obtain a deep penetration of the reactive mixture into the filler material, and thus lacks to achieve an effective and homogenously mixing up of the reactive mixture with the filler material. The flow of filler material is only affected substantially peripherally by the reactive mixture. The reactive mixture has not a sufficient kinetic energy and a proper moving direction to be injected towards a center line of the discharge duct 12 and to reach also the inner zones of the flow of filler material and therefore settles on such a flow by generating a jacket shaped stream. This is due to the inadequate geometry of the tubular cleaning member 22 which alone is not able to effectively deviate and direct the chemically reactive mixture towards and into the flow of filler material.

Furthermore, in such an apparatus, a self-cleaning operation can not be obtained by causing mechanical members to slide inside the distribution annular chamber for the reactive mixture; for that reason, the end portion of the cleaning member 22, which end portion, in the condition of FIG. 2, protrudes out of the duct 12, and the circular groove 16 must be cleaned by a jet of solvent and/or by mechanical means, for example by means of a brush, at the end of any discharge step, before each new discharge step. All that implies the use and the disposal of large amount of solvents, waste of time, extension of the working cycle and the intervention of a skilled operator.

U.S. Pat. No. 5,443,797 discloses an apparatus suitable for the production of a flowable reaction mixture from two flowable reactive components. The apparatus comprises a mix head having a mixing chamber in which a discharging piston is slidably mounted and into which the supply lines for the components lead via injection nozzles. The mixing chamber opens, through an exit port, into a guide bore for a tubular throttle slide and into an outlet channel through which the reaction mixture exits the mix head. Between the guide bore and the outlet channel there is defined an inner circular step. The apparatus includes a cleaning piston, for cleaning the outlet channel, which is concentrically surrounded by the above mentioned throttle slide. For a proper and correct functioning of the apparatus, the throttle slide must be positioned in such a way as to occlude almost the whole cross-section area of the connecting port, thus leaving uncovered only a reduced zone thereof, in front of the discharging piston, for the passage of the reactive components. In other words, the throttle slide covers most of the connecting port thus defining a reduced gap which acts as a first throttling zone for the mixture to realize a second mixing step. During functioning, the cleaning piston is positioned close to the inner step so as to define a second throttling zone for the mixture in order to operate a third mixing step and to discharge the reaction mixture as a stabilized sink stream into the outlet channel so that splashes do not form at all. The problem of mixing two or more reactive components with a filler material is not address nor mentioned at all by U.S. Pat. No. 5,443,797 whose only goal is to ensure a rapid stabilization of the mixture stream immediately following throttling.

It is evident that for the production of composite material resulting from the mixing of chemically reactive components with a filler material, particular and precise fluid-dynamic conditions must be ensured which cannot be achieved by the apparatus of U.S. Pat. No. 5,443,797.

U.S. Pat. No. 5,453,249 aims to improve the apparatus disclosed in U.S. Pat. No. 5,443,797 in order to ensure a desired laminar condition of the flow of the mixture immediately after having been throttled. This is pursued by the following configuration. A front face of the throttle slide and a corresponding opposite face formed by a step between the guide bore and the outlet channel, are inclined at the same angle to the center axis of the throttle slide in the direction of flow. In this way, between the cleaning piston and the guide bore, there is defined a slanted cavity for the passage of the mixture Such a slanted cavity communicates with the discharge channel through an annular gap resulting between the front edge of the cleaning piston and the edge of the above-mentioned inner step, which extends around the center axis is an asymmetrical manner. In other words, such a gap has a wideness which varies along a circumferential direction. As a result, the mixture moves from the mixing chamber into the discharge channel in a not uniformly manner, but flows more preferentially from a side provided by the larger zone of the gap and thus reducing the turbulent energy. In conclusion, as above discussed for U.S. Pat. No. 5,443,797, also the apparatus disclosed in U.S. Pat. No. 5,453,249, which is designed for mixing only reactive components together with no filler material, to reduce the turbulence, does not provide the fluid-dynamic conditions required for correctly and effectively mixing two or more reactive components together with a filler material.

OBJECTS OF THE INVENTION

Consequently, the demands exist of providing an improved high-pressure mixing apparatus, suitable for producing a composite material as previously said, which is able to effectively and deeply deviate the chemically reactive resin and direct it with homogenous distribution against and into the flow of filler material, and which, at the same time, is conformed to be entirely self-cleaning, i.e. capable of automatically eject all the residual reactive mixture remaining within it, so as to consequently make unnecessary any appropriate cleaning operation with chemical and physical means at the end of any working cycle.

Thus, an object of the invention is to provide an apparatus for producing a composite material resulting from a reactive mixture with a reinforcing material, which apparatus uses the technology of high-pressure mixing, by means of which apparatus a deeply mixing of the chemically reactive components can be obtained and the distribution of the reactive mixture and the impregnation of said reactive mixture into the flow of reinforcing material is improved, while said reactive mixture and said reinforcing material flow within the discharge duct, which apparatus is as well provided with suitable means for carrying out an easy and complete self-cleaning operation.

SUMMARY OF THE INVENTION

According to the invention, a high-pressure mixing apparatus is provided suitable for producing and discharging a composite material resulting from a reactive mixture of at least a first and a second chemical component and from a filler material, said apparatus comprising:

a main body, conformed with a discharge duct for the composite material, said discharge duct having a peripheral wall extending between a rear end and a fore end;

at least one high-pressure mixing chamber for the chemical components, said mixing chamber having an exit port connectable to the rear end of said discharge duct;

a first cleaning member axially displaceable between a forward position and a rearward position within the discharge duct, said first cleaning member being conformed with a through hole defining a feeding channel for the filler material, said feeding channel extending along a longitudinal axis between a rear end and a fore end of the first cleaning member;

wherein:

said mixing chamber is connectable to the rear end of the discharge duct via an annular distribution chamber for the reactive mixture, said discharge duct having on the rear end an annular surface;

said annular distribution chamber extending coaxially to said discharge duct, and having a constant cross-section area arranged for homogeneously distributing circumferentially the reactive mixture into said discharge duct against, and into the filler material emerging from said feeding channel towards the center line of the discharge duct, a second tubular cleaning member for the annular distribution chamber, coaxially arranged around the first cleaning member and having a respective annular surface facing the annular surface of the discharge duct;

the facing annular surface of the discharge duct being configured for projecting the reactive mixture, emerging from the annular distribution chamber, towards said longitudinal axis against and into the filler material emerging from said feeding channel, the facing annular surfaces of the discharge duct and of the second cleaning member being identically conformed to each other;

said second tubular cleaning member being movable between the forward position in which closes the exit port of the mixing chamber, and the rearward position in which the mutually facing annular surfaces of the discharge duct and of the second tubular cleaning member respectively are axially spaced apart and define, with said first cleaning member, said annular distribution chamber in direct communication with said exit port, said facing annular surfaces defining a passage interface area equal to or higher than 25% of a first cross-section area of said mixing chamber, and in which a second cross-section area of said annular distribution chamber is equal to or less than said first cross-section area, control means for the cleaning members, said control means being selectively actuable to sequentially move the first and the second cleaning member between:

the rearward position, in which the first cleaning member opens the discharge duct, and in combination with the second tubular cleaning member defines said annular distribution chamber, and the forward position, in which, sequentially, the facing annular surfaces of the discharge duct and the second cleaning member respectively are mutually abutting to eject the residual reactive mixture and close the exit port of the mixing chamber, and in which the first cleaning member ejects the residual composite material inside, and adhering to the wall of the discharge duct.

BRIEF DESCRIPTION OF DRAWINGS

These and further features of the apparatus according to the present invention will better result from the following description of a preferred embodiment, with reference to the enclosed drawings, in which:

FIG. 4 is a first enlarged detail of FIG. 3, with the apparatus in the open condition;

FIG. 5 is a cross section according to line 5-5 of FIG. 4;

FIG. 6 is a second enlarged detail, similar to FIG. 4, with an annular distribution chamber for discharging the reactive mixture in a closed condition and the discharge duct still in open condition;

DETAILED DESCRIPTION OF THE INVENTION

Figure 3:
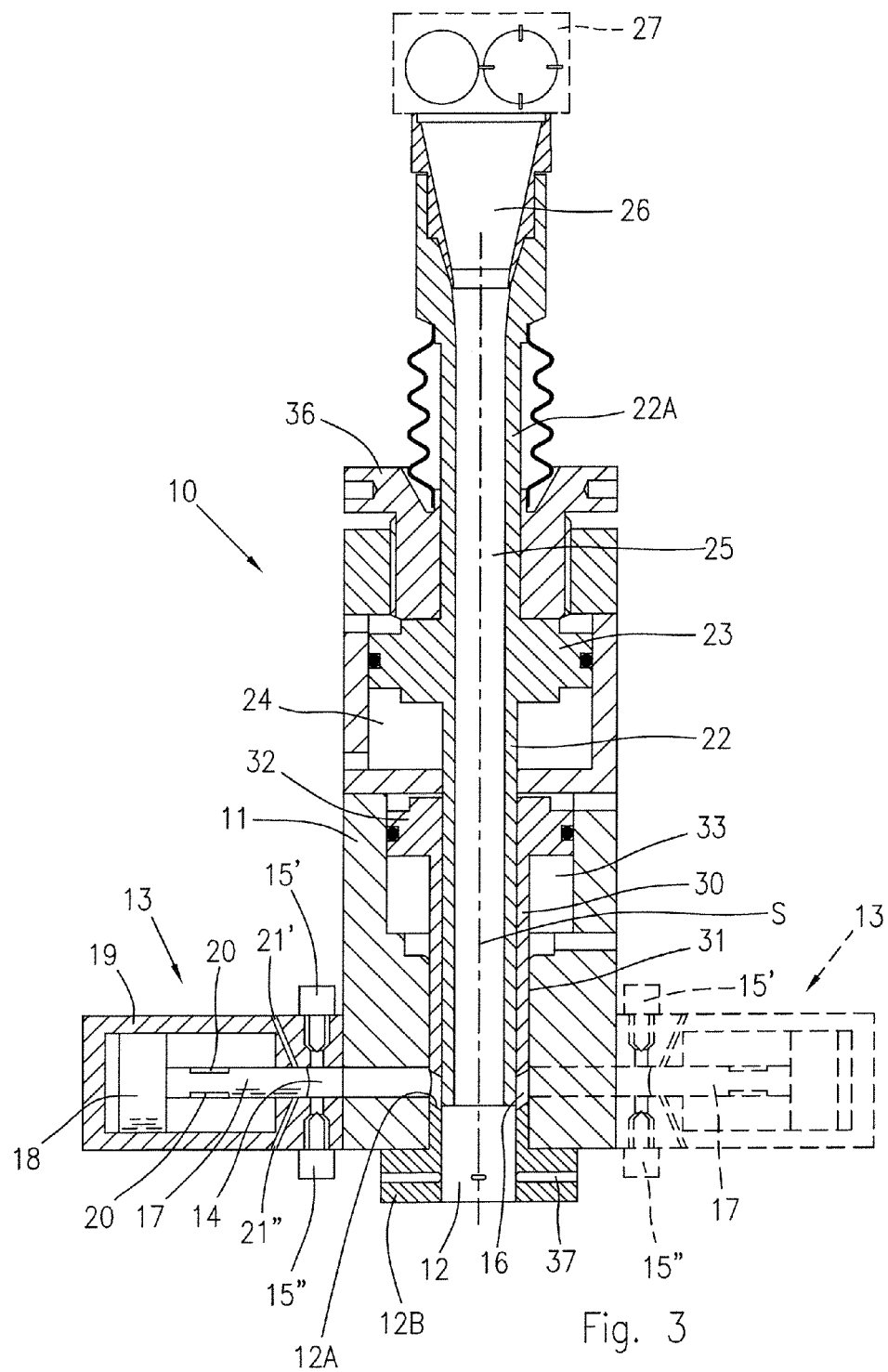
FIG. 3 is a longitudinal section of the apparatus according to the invention, in an open condition.

In FIG. 3, an apparatus according to the invention is indicated with the referral number 10, suitable for producing a composite material resulting from a reactive mixture of a first and a second chemical component and from a filler material 60. The apparatus 10 comprises a main body 11 provided with a duct 12 for discharging the resulting composite material, said duct 12 having a cylindrical wall extending between a rear end 12A and a fore end 12B. The chemically reactive mixture can be any synthetic resin, for example a polyurethane resin, an epoxy resin, a polyester resin at the liquid state or at the state of a thick cream or froth.

The filler or reinforcing material 60, in turn, can consists of powdery material, granular material or fiber material, for example segments of glass fibers or carbon fibers that are fed at a fluidized state.

On one or more sides of the main body 11, the apparatus comprises a high-pressure mixing device 13 for at least a first and a second chemical component, suitable for giving rise to the reactive mixture having to be mixed with the reinforcing material.

Figure 4B:
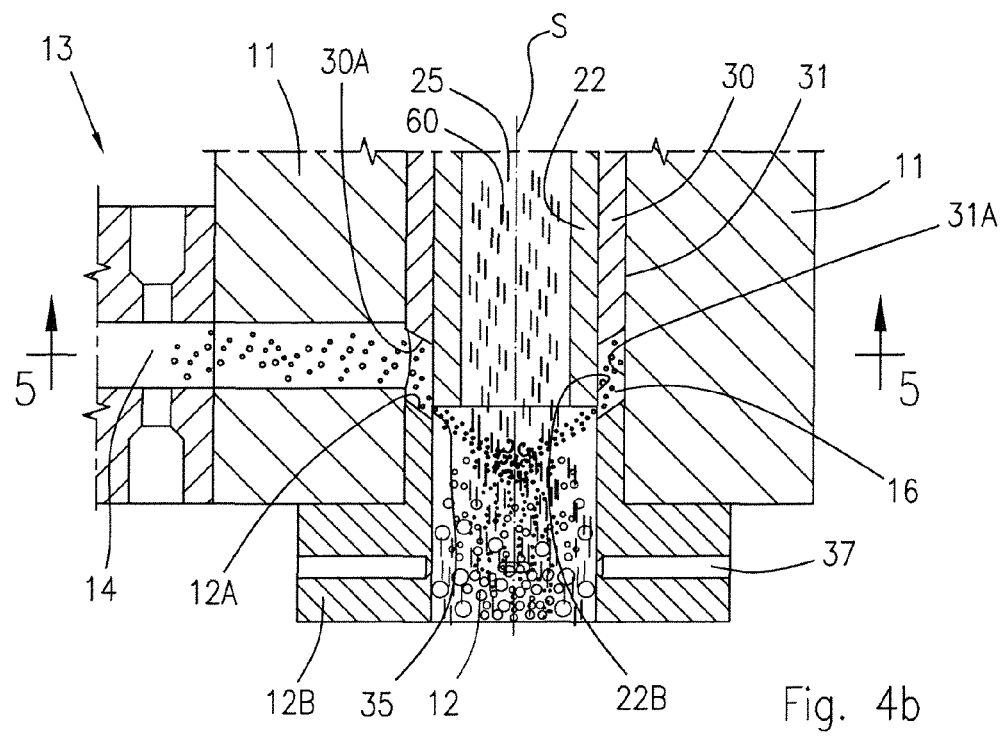
FIG. 4b is a further enlarged detail of FIG. 3, with the apparatus in the open condition, which better shows how the reactive mixture is directed against and into a central flow of filler material which emerges from a feeding channel.

In a per se known manner, the high-pressure mixing device 13 comprises a mixing chamber 14, into which a first injector 15' and a second injector 15" open for respective chemical components, that are deeply mixed in order to produce a chemically reactive mixture that is fed into the discharge duct 12 via an annular distribution chamber 16, shown in the enlarged detail of FIGS. 4 and 5.

The mixing chamber 14 extends transversely, in particular orthogonally, to a longitudinal axis S of the discharge duct 12, and comprises an exit port 50 through which it is connectable to the rear end of the discharge duct 12. The mixing chamber 14, in particular, is conformed like a cylindrical bore, and extends along a respective axis which is planar or parallel with respect to a plane of a toroidal axis of the annular distribution chamber 14.

A slide valve 17 slides within the chamber 14 of the high-pressure mixing device 13, which slide valve 17 is operatively connected with the piston 18 of a hydraulic control cylinder 19; in a per se known manner, the slide valve 17 comprises longitudinal grooves 20 that, in the closed condition of the mixing device 13, enable each single chemical component to flow from each injector 15', 15" into a respective recirculating duct 21', 21", and into a storage tank, not shown.

Figure 1:
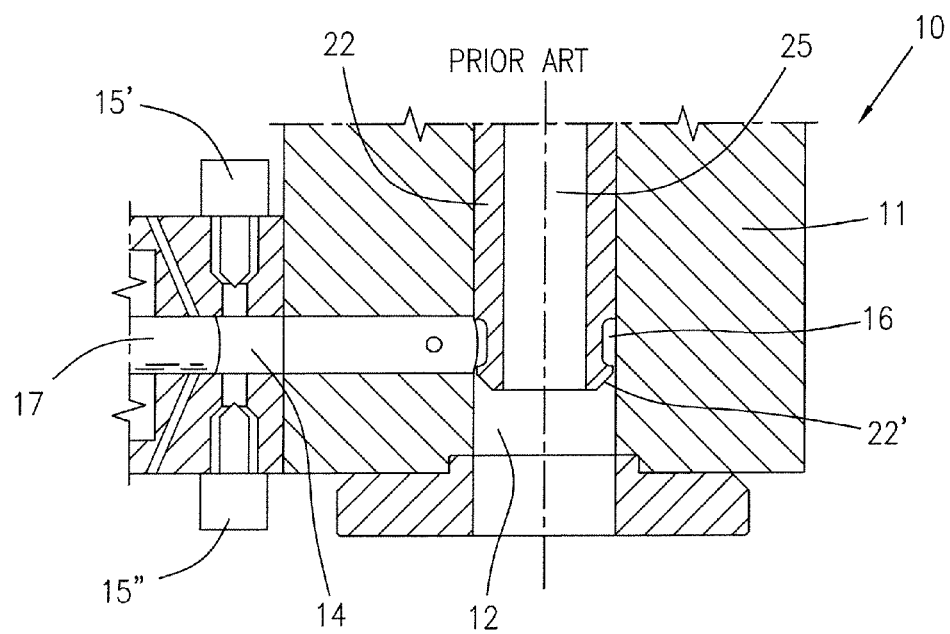
FIG. 1 is a detail of a prior art apparatus, in open condition.
Figure 2:
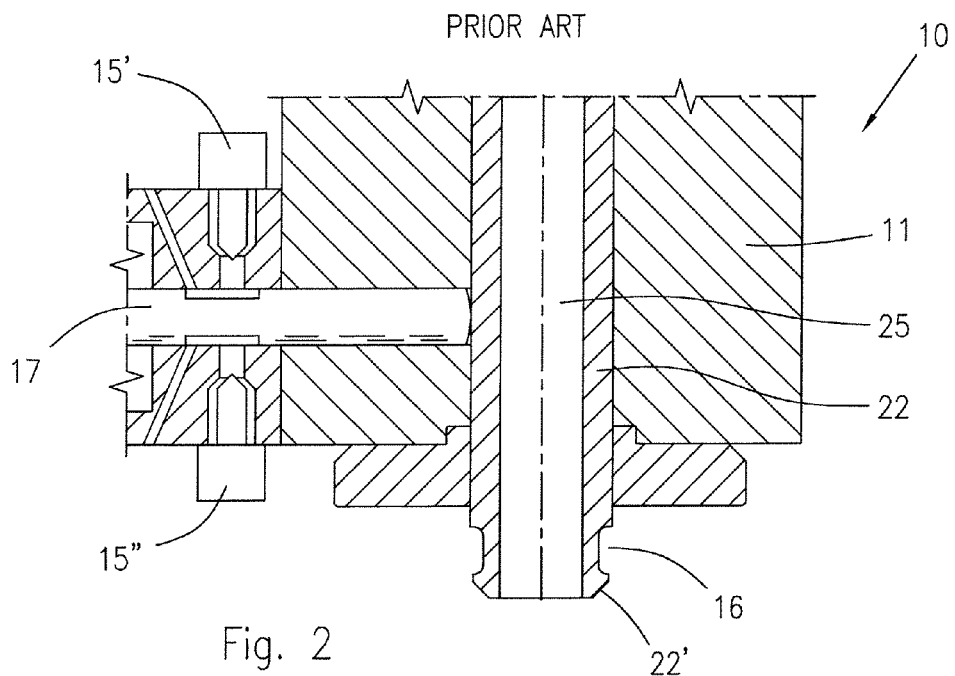
FIG. 2 is a detail of the prior art apparatus of FIG. 1, in closed condition.
Figure 10:
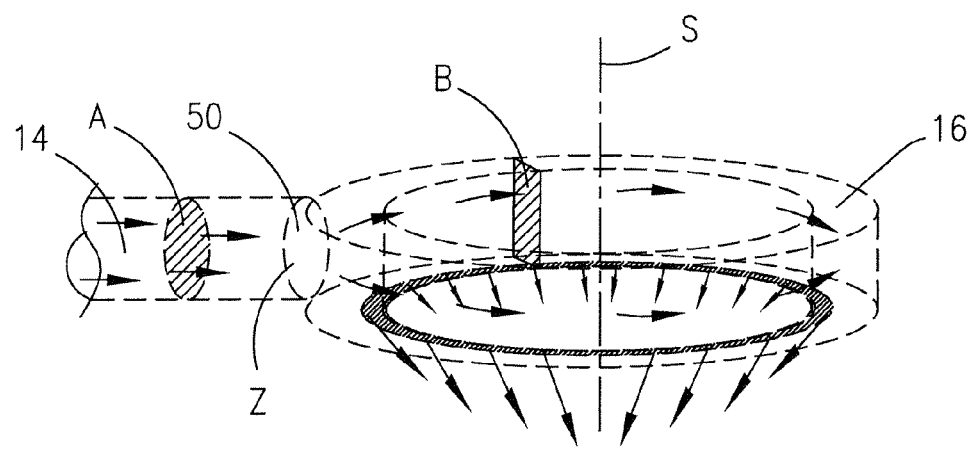
FIG. 10 schematically shows part of a mixing chamber having an exit port which faces, and is in direct communication with, the annular distribution chamber.
Figure 11:
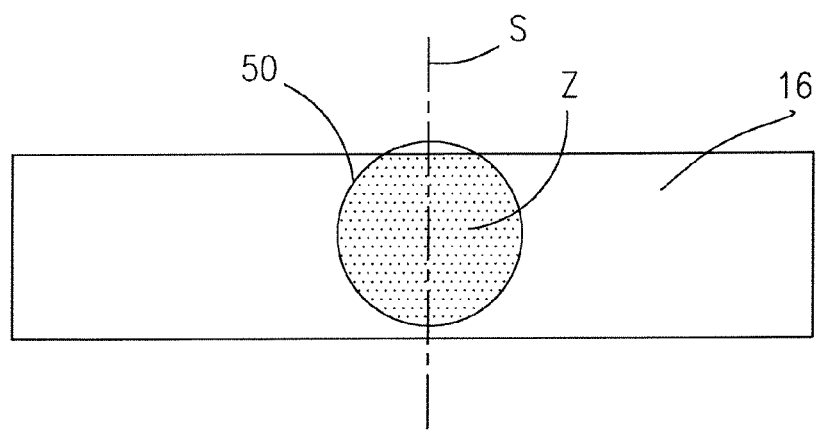
FIG. 11 shows a passage interface area, between the exit port and the annular distribution chamber, through which the reactive mixture can flow into the annular distribution chamber.
Figure 12:
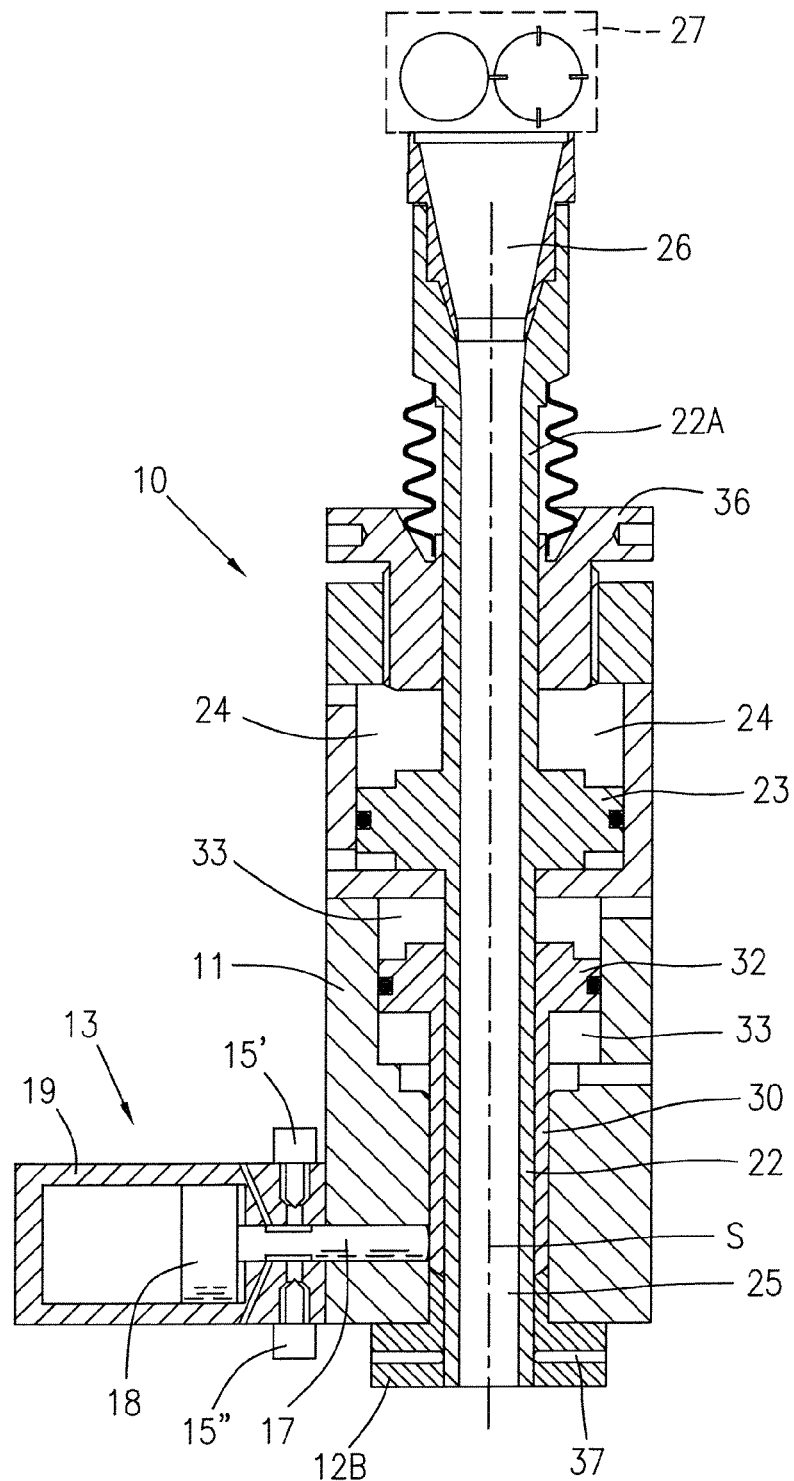
FIG. 12 is a longitudinal section of the apparatus, in closed condition.
Figure 13:
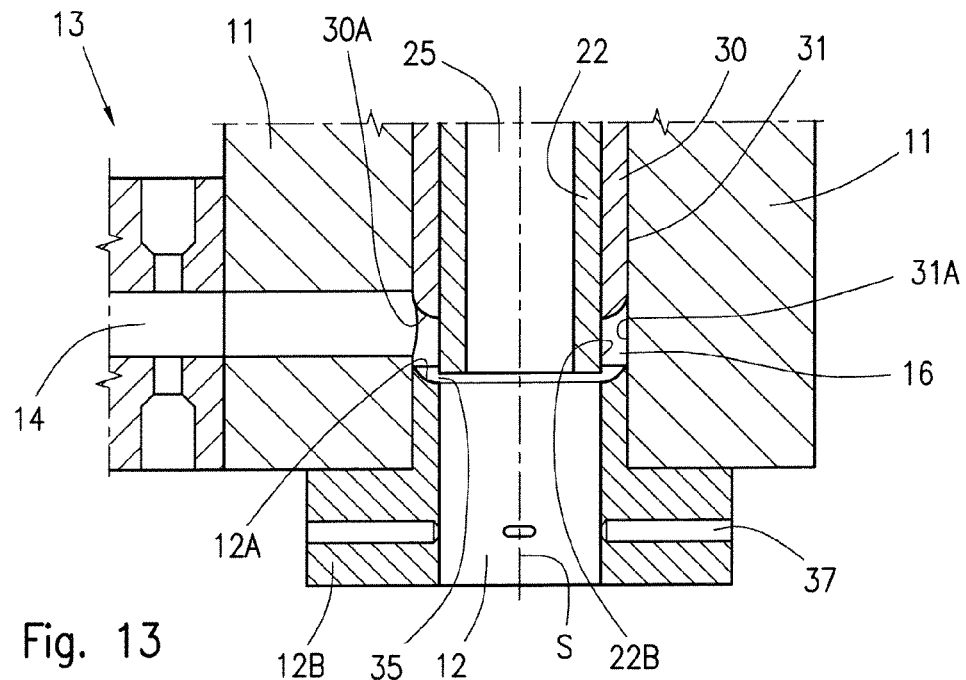
FIG. 13 is an additional enlarged detail of FIG. 3 showing concave and convex cross profiles for the facing surfaces of the discharge duct and the second cleaning members, respectively.
Figure 14:
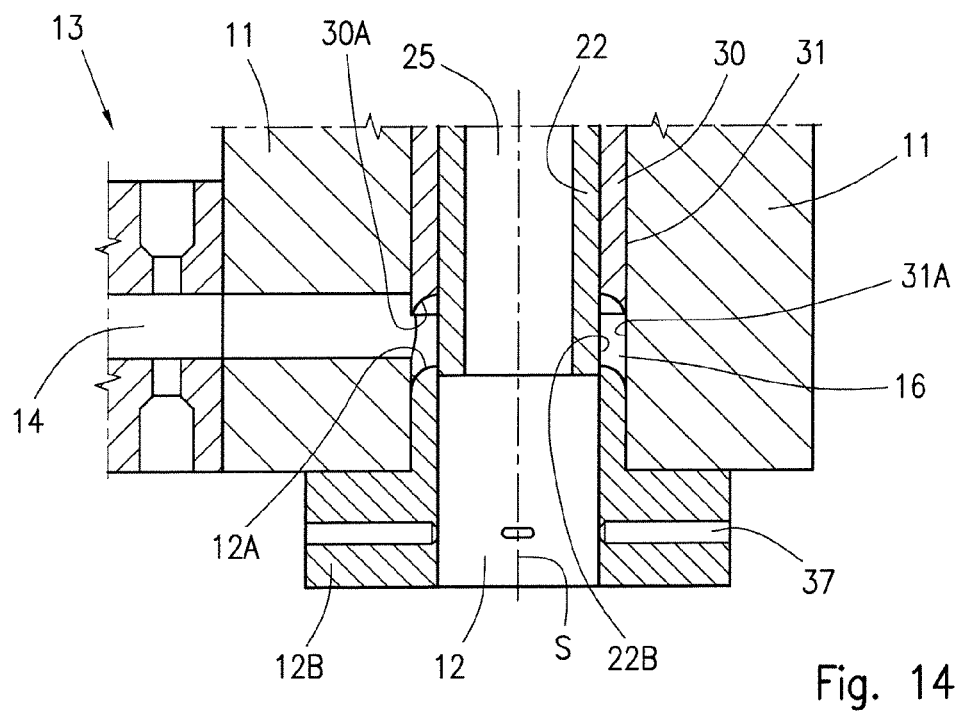
FIG. 14 is an additional enlarged detail of FIG. 3 showing a convex and concave cross profiles for the facing surfaces of the discharge duct and the second cleaning members, respectively.

The apparatus 10 further comprises a first tubular member 22 for cleaning the discharge duct 12, which first tubular member 22 is connected with the piston 23 of a first hydraulic actuator 24 in order to be displaced between a rearward position, shown in FIGS. 1, 3 and 4, and a forward position, shown in FIG. 10. The cleaning member 22 rearwardly extends beyond the piston 23 with a portion 22A protruding from the body 11; the cleaning member 22 and the rear extension 22A of said cleaning member 22 comprise a feeding channel 25 for feeding a reinforcing material, in the form of a through hole forwardly opening towards the discharge duct 12; the filler material 60 is entrained along the channel 25 towards the discharge duct 12 in fluidized form by means of an air flow generated by a venturi tube 26, placed at the rear end of the channel 25. In the case that the filler material 60 consists of a flow of glass fibers, carbon fibers or other suitable fibrous material, said fibers are obtained from continuous fibers that are cut in segments of predetermined length by means of a cutting device 27, upstream to the venturi tube 26.

The apparatus 10 further comprises a second tubular cleaning member for the annular distribution chamber 16, which second tubular cleaning member consists of a sleeve 30, coaxially sliding, in intermediate position, between the first cleaning member 22 and a guide hole 31 in the body 11 of the apparatus 10. The sleeve 30 is operatively connected with the piston 32 of a second hydraulic actuator 33, in order to be sequentially displaced between a rearward position, shown in FIGS. 1, 3 and 4, and a forward position, shown in FIGS. 6 and 10.

FIGS. 4, 5, 6 and 10 show a main feature of the apparatus, according to which the control means of the two cleaning members 22 and 30, consisting of the two hydraulic cylinders 24 and 33, are suitable for being selectively and sequentially actuated to displace the first and the second cleaning members 22 and 30 between a first rearward position, shown in FIG. 4, and a second forward position, shown in FIG. 10. In particular, in the rearward position of the two cleaning members 22 and 30, the identically conformed, mutually facing, annular end surfaces 12A and 30A of the discharge duct 12 and the second cleaning member 30, in combination with corresponding cylindrical surfaces of the first cleaning member 22 and the guide hole 31, define, in the open condition of the apparatus, the distribution annular chamber 16. In such an open condition, said exit port 50 is in direct communication with, and faces the annular distribution chamber 16 via a passage interface area Z equal to or higher than 25% of a first cross-section area A of the mixing chamber 14. In this way, the reactive mixture easily enters the annular distribution chamber 14 for being homogenously distributed along a circumferential direction. The reactive mixture is subsequently directed, via a narrow circular slit 35, into the discharge duct 12 and is projected, by the annular surface 12A, against, and into the filler material 60 emerging from the feeding channel 25.

In the open condition, the facing annular surfaces 12A and 30A are mutually spaced to define a second cross-section area B of the annular distribution chamber 16 equal to or less than the first cross-section area A of the mixing chamber 14. In a version, the second cross-section area B of the annular distribution chamber 16 has a value ranging from 15% to 80% of the first cross-section area A of the mixing chamber 14.

From experimental tests, it has been found that the above mentioned value of 25% is the minimum suitable value at which a throttling action on the mixture is prevented during passage of the mixture from the mixing chamber 14 into the annular distribution chamber 16. Therefore, with values of the passage interface area Z equal to or higher than 25% of a first cross-section area A of the mixing chamber 14, the reactive mixture coming from the mixing chamber 14 easily enters the annular distribution chamber 16 without being throttled. Advantageously, the annular distribution chamber 16, configured with the second cross section B as above described, increases a uniform speed and promotes a homogenous annular distribution of the reactive mixture, thus preventing any deposits and "build-up" phenomenon of the latter, whilst the annular surface 12A of the discharge duct 12, by projecting the reactive mixture towards the longitudinal axis S, causes a deep penetration of the reactive mixture into the filler material 60, and thus an effective and homogenous mixing up of the reactive mixture with the filler material 60. The flow of filler material 60 is affected not only peripherally but especially in its central zone, owing to the proper moving direction and high kinetic energy owned by the reactive mixture, as can be seen in particular in FIG. 4b. Consequently, a high quality composite material is obtained, resulting from the deep penetration and distribution of the reactive mixture into the filler material 60.

In the forward position of the two cleaning members 22 and 30, in the position of closure of the apparatus, the second cleaning member 30 closes the distribution annular chamber 16, ejecting the residual reactive mixture remaining within the discharge duct 12, since the two similarly conformed, facing surfaces 30A and 12A of the second cleaning member 30 and of the discharge duct 12, mutually come into contact to each other, and in which the first cleaning member 22 closes and ejects, from the discharge duct 12, the residual composite material remaining adhering to the walls within said discharge duct 12.

In particular, from FIG. 4 it is noticed that, in the open condition, the distribution annular chamber 16 for the reactive mixture is delimited, on two sides, by opposing cylindrical surfaces, respectively by the internal cylindrical surface 31A of the guide hole 31 and by the external cylindrical surface 22B of the first cleaning member 22; furthermore, in the example under consideration, the chamber 16 is upwardly delimited by a conical surface 30A at the fore end of the sleeve 30, or second cleaning member, whereas said chamber 16 is downwardly delimited by a conical surface 12A at the rear end of the discharge duct 12, said conical surface 12A having the same conicity as the surface 30A.

Figure 6B:
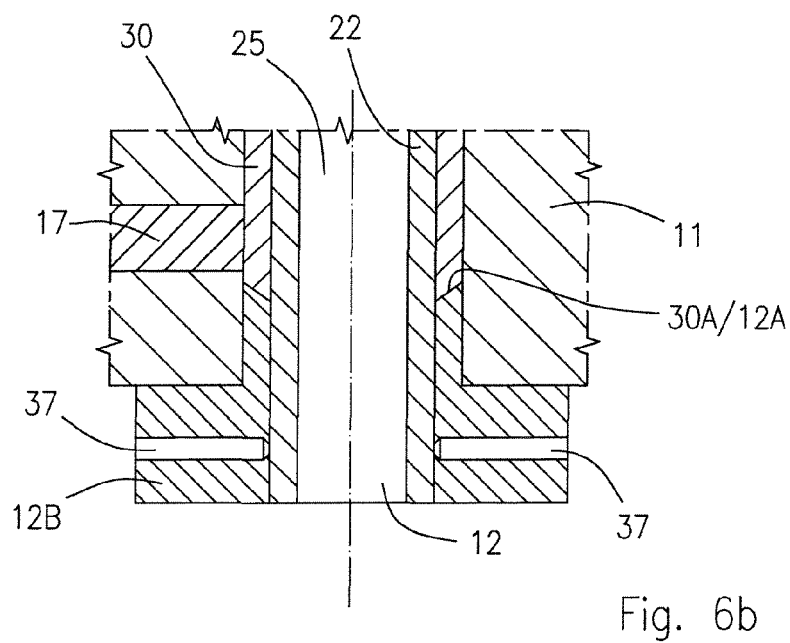
FIG. 6b is a further enlarged detail showing the apparatus with the annular distribution chamber and the discharge duct in a closed condition.
Figure 7:
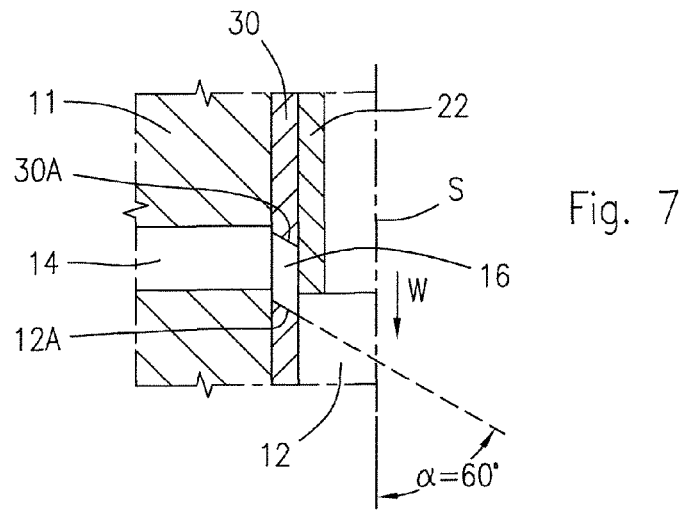
FIG. 7 is a detail showing a first embodiment of the distribution annular chamber.
Figure 8:
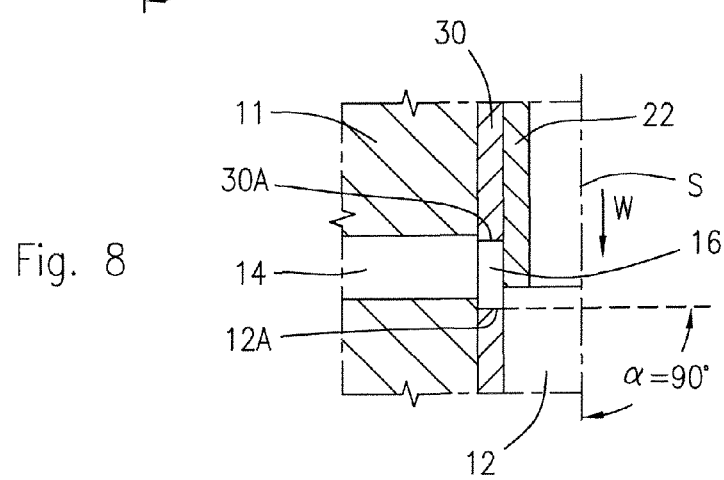
FIG. 8 is a detail showing a second embodiment of the distribution annular chamber.
Figure 9:
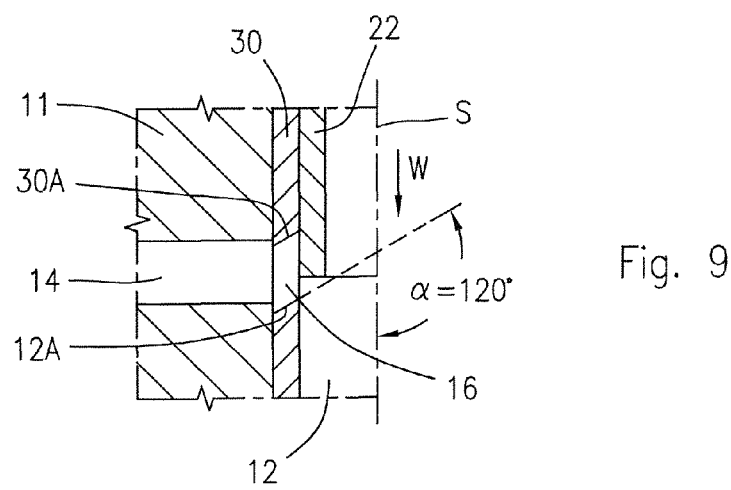
FIG. 9 is a detail showing a third embodiment of the distribution annular chamber.

In the example under consideration, the conical surfaces 30A and 12A, delimiting the annular chamber 16 in the rearward condition of the two cleaning members 22 and 30, are identically conformed, i.e. said conical surfaces 30A and 12A parallel extend to each other so as to strictly come into contact, as shown in FIG. 6, in the closed condition of the mixing chamber 16, in order to eject the residual reactive mixture remaining within the chamber 16 at the end of each discharge step, before said residual reactive mixture hardens. The surfaces 30A and 12A can have any shape and/or inclination with respect to the longitudinal axis of the discharge duct 12. The surfaces 30A and 12A can consist of downward or upward oriented conical surfaces, i.e. converging or diverging with respect to the flowing out direction of the composite material; alternatively, said surfaces 30A and 12A can consist of annular surfaces, lying in parallel planes, orthogonal to the axis of the duct 12. All said above is shown in the details of FIGS. 7, 8 and 9, in which the same referral numbers of the previous figures were used in order to indicate similar or equivalent parts. In general, the angle $\alpha$, enclosed by the surfaces 12A and 30A with respect to the longitudinal axis S of the discharge duct 12, can range between 20° and 160°, so as to eject the residual mixture and to favor cleaning as the distribution chamber 16 closes. In particular, in FIG. 7 the conical surfaces 12A and 30A converge in the flow direction W of the exiting composite material, with an angle $\alpha=60°$; in FIG. 8, the surfaces 12A and 30A lie in parallel planes, enclosing an angle α=90° with respect to the arrow W, whereas, in FIG. 9 the conical surfaces 12A and 30A diverge with respect to W by an angle α=120°.

Alternatively to what said above, the surfaces 12A and 30A can have any shape or profile mutually conformed to each other, concave or convex, in the longitudinal section of said surfaces 12A and 30A; in this case, the angle α must be considered the angle enclosed between the longitudinal axis S of the discharge duct and the tangent line to the concave or convex profile, at the internal edge of the two annular surfaces 12A and 30A.

In all the cases, an annular jet of reactive mixture results to be formed, radially and concentrically oriented with respect to the flow of filler material 60 flowing out of the feeding channel 25.

In the open condition of the annular chamber 16, as shown in FIGS. 3 and 4, the rearward position of the first cleaning member 22 can be any; preferably, the stop position of the cleaning member 22 must be such to form an annular throttling slit 35 between opposing edges at the fore end of the cleaning member 22 and at the rear end of the discharge duct 12, said annular throttling slit 35 advantageously causing an acceleration of the annular jet of mixture, that is generated by a controlled pressure drop within the reactive mixture flowing out of the distribution chamber 16. Thus, besides the flow of reactive mixture being concentrically directed, a controlled discharge of a possible expanding gaseous agent is also allowed, for example carbon dioxide or other low-boiling inert gas, previously dissolved under pressure in at least one of the chemical components of the mixture.

It was already said that, the first cleaning member 22 can be stopped and adjusted in any position with respect to the annular chamber 16, i.e. with respect to the rear end 12A of the discharge duct 12, in order to form an outlet slit 35 of prefixed width, suitable for causing the required pressure drop in the flow of the reactive mixture flowing out of the mixing chamber 14.

The stopping and the adjusting of the rearward position of the first cleaning member 22 can be carried out with any suitable means; in FIGS. 3 and 10 the stopping means was exemplified by an element 36, suitable for being tightly screwed at the rear end of the body 11 of the apparatus. Also the second cleaning member 30 can be adjusted in the desired position by means of an adjustable stopping device similar to the element 36. Alternatively, the throttling or the reduction of the slit 35 can be obtained by varying and adjusting, by means of screwing, the position of the discharge duct 12, a suitable shim being interposed between said duct 12 and the end of the body 11.

Eventually, as shown in the various figures, the discharge duct 12 may end with an external portion provided with radial nozzles 37 in order to generate, in a controlled mode, air jets, according to a sequential logic, programmed in a suitable control device, said air jets being suitable for causing different side deflections of the flow of composite material, exiting the discharge duct 12. Consequently, by properly acting according to different sequential logic for activating and/or deactivating the different air jets, different deflection angles for the material flow can be obtained and, consequently, different ways for distributing the material onto a substrate or into a cavity of a mold.

In particular, as shown in FIG. 4, the air jets can be activated and/or deactivated individually, in a sequential mode, in contiguous pairs and/or in opposed pairs, by means of proper electronic control valves, not shown, characterized by a high activation and deactivation speed, with a switching frequency ranging for example between 5 and 40 Hz, suitable for being operatively connected with a source of pressurized air by means P of air flow controllers FC.

In a few words, the operation of the disclosed apparatus results as follows:

Starting from the close condition shown in FIG. 10, by means of the hydraulic actuators 24 and 33, the first cleaning member 22 is sequentially controlled to move back, opening the discharge duct 12, and, successively, the sleeve or second cleaning member 30, as shown in FIG. 3 and in the enlarged detail of FIG. 4, is sequentially controlled to move back, opening thus the annular chamber 16 and the communication towards the high-pressure mixing device 13.

Consequently, moving back the two cleaning members 22 and 30 opens the discharge duct 12 and the annular chamber 16 for distribution of the reactive mixture, forming, at the same time, the circular throttling slit 35.

Once the two cleaning members 22 and 30 were withdrawn, the slide valve 17 is moved back and the feeding is ordered of the different components of the reactive mixture towards the high-pressure mixing device 13 or the high-pressure mixing devices 13 and, simultaneously, the feeding is ordered of the fluidized filler material 60, that is entrained, at high speed by an air flow, along the channel 25 into the first cleaning member 22 and the discharge duct 12; this condition is shown in FIGS. 3 and 4 of drawings.

The jet of reactive mixture flowing out of the annular slit 35 of the distribution chamber 16 is radially projected, in concentric and uniform manner, towards and against the flow of fibers, or, more in general, towards and against the flow of the filler material 60 flowing out of the feeding channel 25, said jet of reactive mixture being able to soak the filler material 60 up to the central region of the feeding channel 25; said jet of reactive mixture is then accelerated and entrained in the flow direction W by the impact with the filler material 60 and further dispersed into the fibers by the air flow flowing out of the nozzles 37 in the end portion of the discharge duct 12.

At the end of each working cycle of the apparatus 10, the feeding of the chemical components of the reactive mixture is stopped, causing the slide valve 17 to move forward up to a very short distance from the surface 31, as well as the feeding is stopped of the fibers or the reinforcing material.

A this point, the sleeve 30, or second cleaning member, is sequentially ordered to advance, closing the annular chamber 16 and expelling into the discharge duct 12 the residual mixture remaining within said distribution annular chamber.

The forward movement of the sleeve 30, besides to clean the distribution chamber 16, also contributes to clean the external surface of the first cleaning member 22.

Successively, the first cleaning member 22 is caused to advance, closing the discharge duct 12 and expelling the residual mixture of material remaining adhering to the surfaces within said discharge duct 12. Thus, a complete automatic self-cleaning of the entire apparatus is obtained, preventing as well any protrusion of the two cleaning members from the discharge duct 12.

From all said and shown in the enclosed drawings, it is clear that a self-cleaning high-pressure mixing apparatus is provided, suitable for achieving the desired objects, in which, due to the conformation and arrangement of the discharge duct 12 and the two cleaning members 22 and 30, an automatic self-cleaning is made possible of the distribution annular chamber for the reactive mixture, as well as a self-cleaning is made possible of said cleaning members; furthermore, the substantially radial, concentric orientation of the annular jet of reactive mixture, with respect to the apparatuses of known type, enables as well a homogeneous and deep penetration of the reactive mixture into the flow of filler material 60.

In any case, all was said and shown with reference to the enclosed drawings, is intended was given as an explanation of the general features of the apparatus according to the present invention and a preferred embodiment of said apparatus. Consequently, other modifications or variations can be made to the entire apparatus and/or portions of said apparatus, without thereby departing from the scope of the enclosed claims.

What we claim is:

1. A high-pressure mixing apparatus, suitable for producing and discharging a composite material resulting from a reactive mixture of at least a first and a second chemical components and from a filler material, said apparatus comprising:
   a main body, conformed with a discharge duct for the composite material, said discharge duct having a peripheral wall extending between a rear end and a fore end;
   at least one high-pressure mixing chamber for the chemical components, said mixing chamber having an exit port connectable to the rear end of said discharge duct;
   a first cleaning member axially displaceable between a forward position and a rearward position within the discharge duct, said first cleaning member being conformed with a through hole defining a feeding channel for the filler material, said feeding channel extending along a longitudinal axis between a rear end and a fore end of the first cleaning member;
   wherein:
   said mixing chamber is connectable to the rear end of the discharge duct via an annular distribution chamber for the reactive mixture, said discharge duct having on the rear end an annular surface;
   said annular distribution chamber extending coaxially to said discharge duct, and having a constant cross-section area arranged for homogeneously distributing circumferentially the reactive mixture into said discharge duct,
   a second tubular cleaning member for the annular distribution chamber, coaxially arranged around the first cleaning member and having a respective annular surface facing the annular surface of the discharge duct;
   the facing annular surface being configured for projecting the reactive mixture, emerging from the annular distribution chamber, towards said longitudinal axis against and into the filler material emerging from said feeding channel,
   the facing annular surfaces of the discharge duct and of the second cleaning member being identically conformed to each other;
   said second tubular cleaning member being movable between the forward position in which closes the exit port of the mixing chamber,
   and the rearward position in which the mutually facing annular surfaces of the discharge duct and of the second tubular cleaning member respectively are axially spaced apart and define, with said first cleaning member, said annular distribution chamber in direct communication with said exit port, said facing annular surfaces defining a passage interface area equal to or higher than 25% of a first cross-section area of said mixing chamber, and in which a second cross-section area of said annular distribution chamber is equal to or less than said first cross-section area,
   control means for the cleaning members, said control means being selectively actuable to sequentially move the first and the second cleaning member between:
   the rearward position, in which the first cleaning member opens the discharge duct, and in combination with the second tubular cleaning member defines said annular distribution chamber, and
   the forward position, in which, sequentially, the facing annular surfaces of the discharge duct and the second cleaning member respectively are mutually abutting to eject the residual reactive mixture and close the exit port of the mixing chamber, and in which the first cleaning member ejects the residual composite material inside, and adhering to the wall of the discharge duct.

2. The high-pressure mixing apparatus according to claim 1, wherein said second cross-section area of said annular distribution chamber has a value ranging from 15% to 80% of said first cross-section area of said mixing chamber.

3. The high-pressure mixing apparatus according to claim 1, wherein the tangent to said facing annular surfaces of the discharge duct and of the second cleaning member respectively, at their internal edge, makes an angle ranging between 20° and 160° with respect to said longitudinal axis of the discharge duct.

4. The high-pressure mixing apparatus according to claim 3, wherein the facing annular surfaces of the discharge duct and of the second cleaning member respectively comprise conical surfaces converging towards the fore end of the discharge duct.

5. The high-pressure mixing apparatus according to claim 3, wherein the facing annular surfaces of the discharge duct and of the second cleaning member respectively comprise conical surfaces diverging towards the fore end of the discharge duct.

6. The high-pressure mixing apparatus according to claim 3, wherein the facing annular surfaces of the discharge duct and of the second cleaning member respectively comprise planar parallel surfaces orthogonally arranged to the longitudinal axis of the discharge duct.

7. The high-pressure mixing apparatus according to claim 3, wherein the facing annular surfaces of the discharge duct and of the second cleaning member respectively exhibit facing surfaces having a concave and/or convex profile of the longitudinal section.

8. The high-pressure mixing apparatus according to claim 1, wherein the distribution annular chamber communicates with the discharge duct via a circular throttling slit, between opposite edges of the discharge duct and the first cleaning member respectively, in the open condition of the distribution annular chamber.

9. The high-pressure mixing apparatus according to claim 8, wherein the throttling slit is adjustable.

10. The high-pressure mixing apparatus according to claim 9, wherein the throttling slit is adjustable by axially controlling the position of the discharge duct.

11. The high-pressure mixing apparatus according to claim 8, comprising adjustable stop means for the first and/or the second cleaning member respectively in the rearward position, in order to control the width of the throttling slit.

12. The high-pressure mixing apparatus according to claim 1, wherein the control means for the cleaning members comprises a hydraulic actuator for the second cleaning member, said hydraulic actuator being coaxially arranged with respect to the first cleaning member of the discharge duct.

13. The high-pressure mixing apparatus according to claim 1, wherein the feeding channel for the filler material rearwardly extends towards a Venturi tube for feeding an air flow entraining the filler material.

14. The high-pressure mixing apparatus according to claim 1, comprising means for generating radial air jets, suitable for being sequentially actuated to deflect the flow of composite material at the outlet of the discharge duct.

15. The high-pressure mixing apparatus according to claim 14, wherein said means for generating air jets comprises radial nozzles suitable for being selectively connected to a pressurized air source by a flow controller.

16. The high-pressure mixing apparatus according to claim 15, wherein the nozzles for generating the air jets are suitable for being sequentially connected, singularly and/or in pairs, with the pressurized air source, according to a programmed mode.

17. The high-pressure mixing apparatus according to claim 1, wherein the filler material consists of fiber material, comprising cutting means for the fiber material, at the rear end of the first cleaning member of the discharge duct.

18. A method for producing and discharging a composite material resulting from a reactive mixture of at least a first and a second chemical components and from a filler material by means of a high-pressure mixing apparatus, suitable for producing and discharging a composite material resulting from a reactive mixture of at least a first and a second chemical components and from a filler material, said apparatus comprising:
- a main body, conformed with a discharge duct for the composite material, said discharge duct having a peripheral wall extending between a rear end and a fore end;
- at least one high-pressure mixing chamber for the chemical components, said mixing chamber having an exit port connectable to the rear end of said discharge duct;
- a first cleaning member axially displaceable between a forward position and a rearward position within the discharge duct, said first cleaning member being conformed with a through hole defining a feeding channel for the filler material, said feeding channel extending along a longitudinal axis between a rear end and a fore end of the first cleaning member;

wherein:
said mixing chamber is connectable to the rear end of the discharge duct via an annular distribution chamber for the reactive mixture, said discharge duct having on the rear end an annular surface;
said annular distribution chamber extending coaxially to said discharge duct, and having a constant cross-section area arranged for homogeneously distributing circumferentially the reactive mixture into said discharge duct,
a second tubular cleaning member for the annular distribution chamber, coaxially arranged around the first cleaning member and having a respective annular surface facing the annular surface of the discharge duct;
the facing annular surface being configured for projecting the reactive mixture, emerging from the annular distribution chamber, towards said longitudinal axis against and into the filler material emerging from said feeding channel,
the facing annular surfaces of the discharge duct and of the second cleaning member being identically conformed to each other;

said second tubular cleaning member being movable between the forward position in which closes the exit port of the mixing chamber,
and the rearward position in which the mutually facing annular surfaces of the discharge duct and of the second tubular cleaning member respectively are axially spaced apart and define, with said first cleaning member, said annular distribution chamber in direct communication with said exit port, said facing annular surfaces defining a passage interface area equal to or higher than 25% of a first cross-section area of said mixing chamber, and in which a second cross-section area of said annular distribution chamber is equal to or less than said first cross-section area,
control means for the cleaning members, said control means being selectively actuable to sequentially move the first and the second cleaning member between:
the rearward position, in which the first cleaning member opens the discharge duct, and in combination with the second tubular cleaning member defines said annular distribution chamber, and
the forward position, in which, sequentially, the facing annular surfaces of the discharge duct and the second cleaning member respectively are mutually abutting to eject the residual reactive mixture and close the exit port of the mixing chamber, and in which the first cleaning member ejects the residual composite material inside, and adhering to the wall of the discharge duct,
said method comprising the steps of:
selectively moving the first and the second cleaning members in the rearward positions to sequentially open and put into communication the mixing chamber, via said annular distribution chamber, with said discharge duct,
selectively moving the first and the second cleaning members in the rearward positions to sequentially open and put into communication the mixing chamber, via said annular distribution chamber, with said discharge duct,
mutually arranging said facing annular surfaces to define a passage interface area between the mixing chamber and the annular distribution chamber equal to or higher than 25% of a first cross-section area of said mixing chamber, and to define a second cross-section area of said annular distribution chamber equal to or less than said first cross-section area;
feeding the chemical components into the mixing chamber and flowing the resulting mixture into the annular distribution chamber through said exit port; and
injecting the resulting mixture outcoming from the annular distribution chamber through a restricted annular gap, defined between the annular surface of the discharge duct and a fore edge of the first cleaning member, into the discharge duct, and projecting the mixture towards the longitudinal axis against and into the filler material emerging from the feeding channel into the discharge duct.

* * * * *